US006980706B2

(12) United States Patent
Sugiyama

(10) Patent No.: US 6,980,706 B2
(45) Date of Patent: Dec. 27, 2005

(54) WAVEGUIDE OPTICAL MODULATOR

(75) Inventor: Masaki Sugiyama, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 11/057,141

(22) Filed: Feb. 15, 2005

(65) Prior Publication Data

US 2005/0147352 A1 Jul. 7, 2005

Related U.S. Application Data

(63) Continuation of application No. PCT/JP03/03540, filed on Mar. 24, 2003.

(51) Int. Cl.[7] ................................ G02F 1/035
(52) U.S. Cl. ................................ 385/2; 385/3; 385/40
(58) Field of Search ................................ 385/1–3, 8–10, 385/40–41

(56) References Cited

U.S. PATENT DOCUMENTS

| | | | |
|---|---|---|---|
| 6,192,167 B1 | 2/2001 | Kissa et al. | 385/3 |
| 6,393,166 B1 | 5/2002 | Burns | 385/2 |

FOREIGN PATENT DOCUMENTS

| | | |
|---|---|---|
| JP | 02-196212 | 8/1990 |
| JP | 03-184014 A | 8/1991 |
| JP | 05-142504 A | 6/1993 |
| JP | 05-210072 A | 8/1993 |
| JP | 07-261135 A | 10/1995 |

*Primary Examiner*—John D. Lee
(74) *Attorney, Agent, or Firm*—Staas & Halsey LLP

(57) ABSTRACT

A waveguide optical modulator has a first Y-branch optical waveguide providing an input port, a second Y-branch optical waveguide providing an output port, first and second optical waveguides interconnecting the first and second Y-branch optical waveguides, first and second signal electrodes disposed respectively on the first and second optical waveguides, and a ground electrode having a potential difference with the first and second signal electrodes and operable in coaction with the first and second signal electrodes for applying an electric field to the first and second optical waveguides. The ground electrode includes a central ground electrode disposed between the first and second optical waveguides, the central ground electrode having an opening defined therein. With this arrangement, since the central ground electrode disposed between the first and second optical waveguides has the opening, a waveguide substrate as a microwave resonance chamber has increased characteristics for effectively suppressing a dip in the frequency vs. response characteristics.

7 Claims, 5 Drawing Sheets

WAVEGUIDE OPTICAL MODULATOR

This is a continuation of PCT International Application NO. PCT/JP03/03540, filed Mar. 24, 2003, which was not published in English.

BACKGROUND OF THE INVENTION

1. Field of the Invention

The present invention relates to a waveguide optical modulator for modulating the power of light output from a light source.

2. Description of the Related Art

Heretofore, optical transmitters for use in optical fiber communication systems have employed a direct modulation process for modulating a current flowing through a laser diode with a data signal. However, it is difficult for the direct modulation process to transmit signals over long distances because an output light signal suffers more chirping as the transmission rate is higher due to the wavelength dispersion occurring in the optical fiber.

In view of the above difficulty, there has been put to practical use an optical transmitter wherein an external modulator that is insusceptible to chirping in principle acts on CW (continuous-wave) light. One known external modulator of this type is a waveguide optical modulator having optical waveguides of a predetermined pattern formed on a waveguide substrate to provide a Mach-Zehnder interferometer and electrodes for applying an electric field to the Mach-Zehnder interferometer.

The waveguide optical modulator has a first Y-branch optical waveguide providing an input port, a second Y-branch optical waveguide providing an output port, first and second optical waveguides interconnecting the first and second Y-branch optical waveguides, first and second signal electrodes disposed respectively on the first and second optical waveguides, and a ground electrode having a potential difference with the first and second signal electrodes and operable in coaction with the first and second signal electrodes for applying an electric field to the first and second optical waveguides.

The power of a light beam is divided into two equal levels by the first Y-branch optical waveguide. The light beams are propagated through the first and second optical waveguides. When the light beams are combined with each other in phase (the phase difference is $2n\pi$ (n is an integer)) by the second Y-branch optical waveguide, the light output of the waveguide optical modulator is turned on. When the light beams are combined with each other out of phase (the phase difference is $(2n+1)\pi$) by the second Y-branch optical waveguide, the light output of the waveguide optical modulator is turned off. Therefore, the waveguide optical modulator can modulate the power of the light beam with less chirping when the voltages applied to the electrodes are changed by an input signal.

FIGS. 1A and 1B of the accompanying drawings are a plan view and a cross-sectional view taken along line b-b of a conventional waveguide optical modulator having a Z-cut $LiNbO_3$ substrate. The waveguide optical modulator includes a Y-branch optical waveguide 4 providing an input port 2, a Y-branch optical waveguide 8 providing an output port 6, and optical waveguides 10 and 12 interconnecting the Y-branch optical waveguides 4 and 8, the waveguides being formed on a waveguide substrate 14. A manufacturing process, and details of the structure and operating principles of the waveguide optical modulator will be described below.

With Ti patterned to the same shape as the waveguides 4, 8, 10 and 12 on the waveguide substrate 14 made of $LiNbO_3$, the assembly is heated at 1050° C. for 7 to 10 hours to form the waveguides 4, 8, 10 and 12 having a high refractive index due to thermal diffusion. If the $LiNbO_3$ substrate is of a Z cut, then since a strong electric field is required in a Z direction along the thickness of the waveguide optical modulator, a signal electrode 16 and a ground electrode 18 are patterned respectively directly above the optical waveguides 10 and 12. To prevent light propagated through the optical waveguides 10 and 12 from being absorbed by the electrodes 16 and 18, a transparent buffer layer 20 of $SiO_2$ is deposited to a thickness ranging from 0.2 to 1.0 $\mu$m on the waveguides 4, 8, 10 and 12. The electrodes 16 and 18 are formed of Au to a thickness ranging from 3 to 20 $\mu$m on transparent buffer layer 20.

To energize the optical modulator, as shown in FIG. 1A, the signal electrode 10 and the ground electrode 12 has their terminal ends connected to each other by a resistor R, providing a progressive-wave electrode, and a microwave input signal V in the range from several GHz to 100 GHz is applied to an end of the progressive-wave electrode. An electric field 22 is now generated between the electrodes 16 and 18. Since the refractive index of the optical waveguides 16 and 18 changes between $+\Delta n$ and $-\Delta n$, input light having a wavelength $\lambda$ as it is modulated to an on- and off-state by the input signal V is output from the output port 6.

With the optical modulator having the progressive-wave electrode, the waveguide substrate may operate as a microwave resonance chamber which causes a particular microwave frequency range to resonate, resulting in poor frequency vs. response characteristics. Specifically, a dip may be produced in the frequency vs. response characteristics which represent the relationship between transmission losses from the input to output ports of the optical modulator and frequencies, as shown in FIG. 2 of the accompanying drawings.

A single-drive optical modulator having one set of signal and ground electrodes as shown in FIGS. 1A and 1B is capable of suppressing the dip in the frequency vs. response characteristics by reducing the width of the ground electrode to provide an electrode-free region on the chip. However, a dual-drive optical modulator having two sets of signal electrodes, as described later on, cannot incorporate the solution of the single-drive optical modulator, and is unable to suppress the dip in the frequency vs. response characteristics.

SUMMARY OF THE INVENTION

It is therefore an object of the present invention to provide a dual-drive waveguide optical modulator with two sets of signal electrodes which is of a structure capable of effectively suppressing a dip in the frequency vs. response characteristics.

In accordance with an aspect of the present invention, there is provided a waveguide optical modulator including a first Y-branch optical waveguide providing an input port, a second Y-branch optical waveguide providing an output port, first and second optical waveguides interconnecting the first and second Y-branch optical waveguides, first and second signal electrodes disposed respectively on the first and second optical waveguides, and a ground electrode having a potential difference with the first and second signal electrodes and operable in coaction with the first and second signal electrodes for applying an electric field to the first and second optical waveguides. The ground electrode includes a central ground electrode disposed between the first and second optical waveguides, the central ground electrode having an opening defined therein.

Since the central ground electrode disposed between the first and second optical waveguides has the opening, a waveguide substrate as a microwave resonance chamber has increased characteristics for effectively suppressing a dip in the frequency vs. response characteristics. As the first and second signal electrodes are disposed independently of each other, they can be used as respective progressive-wave electrodes for operating the waveguide optical modulator in a dual-drive mode.

The above and other objects, features, and advantages of the present invention will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Preferred embodiments of the present invention will be described in detail below with reference to the accompanying drawings. Prior to describing the embodiments of the present invention, a conventional technology which appears to be useful for understanding the usefulness of the present invention will first be described below.

Figure 1A:
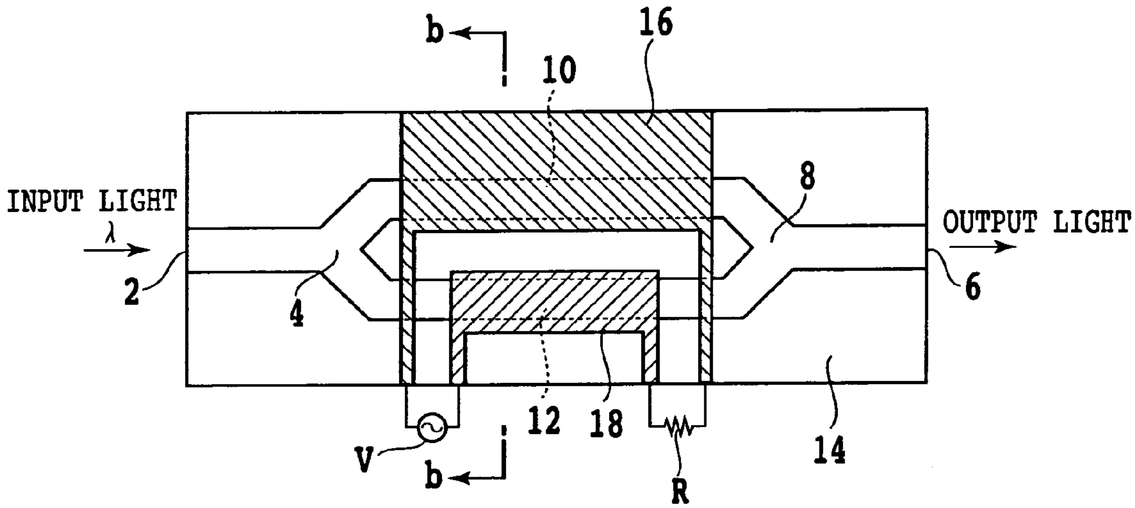
FIGS. 1A and 1B are plan and cross-sectional views, respectively, of a conventional single-drive optical modulator.
Figure 1B:
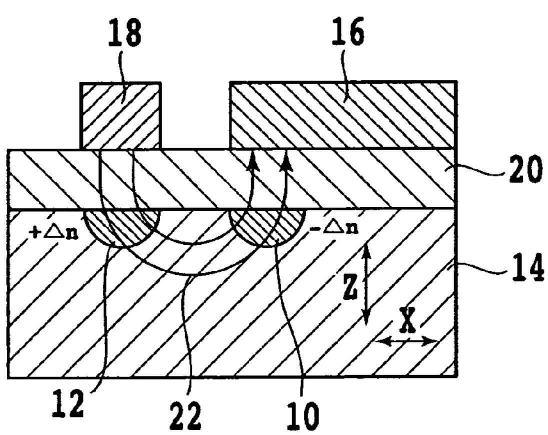
Figure 3:
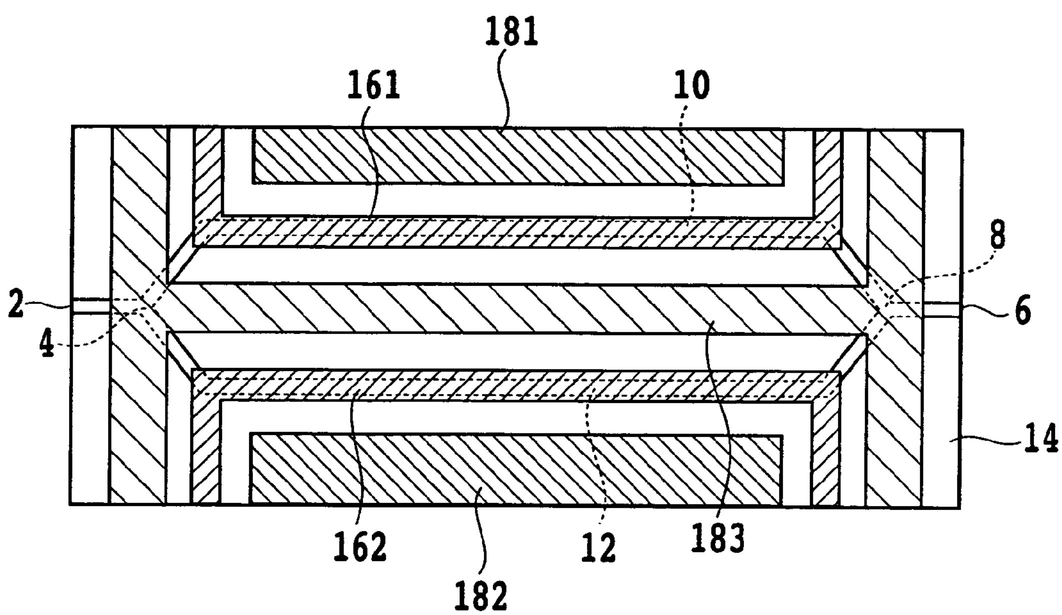
FIG. 3 is a plan view of a conventional dual-drive optical modulator.

FIG. 3 is a plan view of a conventional dual-drive optical modulator. The conventional dual-drive optical modulator has Y-branch optical waveguides 4 and 8 and optical waveguides 10 and 12 which are disposed on a waveguide substrate 14, as with the optical modulator shown in FIGS. 1A and 1B. Signal electrodes 161 and 162 are disposed as progressive-wave electrodes on the optical waveguides 10 and 12, respectively. Ground electrodes 181 and 182 are disposed on both sides of the signal electrodes 161 and 162, with a central ground electrode 183 disposed between the signal electrodes 161 and 162.

Microwave signals in opposite phase are applied to respective ends of the signal electrodes 161 and 162, whose other ends are terminated by a terminal resistor (not shown). Therefore, the optical modulator is capable of performing efficient binary modulation. However, although a single-drive optical modulator is capable of suppressing a dip in the frequency vs. response characteristics by reducing the width of the ground electrode to provide an electrode-free region on the chip, the dual-drive optical modulator shown in FIG. 3 cannot effectively suppress a dip in the frequency vs. response characteristics as such an asymmetric structure cannot be incorporated in both the optical waveguides 10 and 12.

Figure 4:
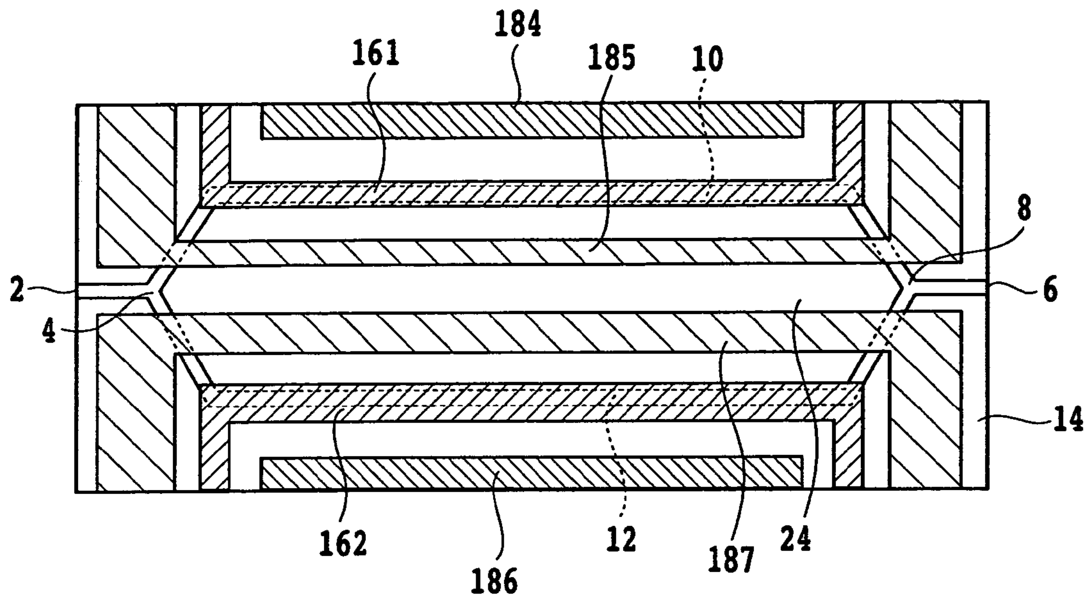
FIG. 4 is a plan view of an optical modulator according to a first embodiment of the present invention.

FIG. 4 is a plan view of an optical modulator according to a first embodiment of the present invention. The optical modulator according to the first embodiment is the same as the optical modulator shown in FIG. 3 in that Y-branch optical waveguides 4 and 8 and optical waveguides 10 and 12 are disposed on a waveguide substrate 14, and signal electrodes 161 and 162 are disposed as progressive-wave electrodes on the optical waveguides 10 and 12, respectively.

According to the present embodiment, in order to achieve the structure of a central ground electrode which provides a feature of the present invention, the electrodes are disposed as follows: Ground electrodes 184 and 185 are disposed in sandwiching relation to the signal electrode 161, and ground electrodes 186 and 187 are disposed in sandwiching relation to the signal electrode 162. An electrode-free gap 24 is present between the ground electrodes 185 and 187 that are positioned between the signal electrodes 161 and 162. Therefore, the ground electrodes 185 and 187 correspond to a central ground electrode, and the gap 24 corresponds to an opening in the central electrode.

Since the central ground electrode positioned between the signal electrodes 161 and 162 is constructed of the two ground electrodes 185 and 186 with the gap 24 (opening) defined therebetween, the characteristics of the waveguide substrate 14 which also operates as a microwave resonance chamber are different from those of the conventional optical modulator shown in FIG. 3, and a dip in the frequency vs. response characteristics is effectively suppressed.

A process of manufacturing the waveguide optical modulator will be described below. The waveguide substrate 14 is provided by polishing, to a mirror finish, the surface of a slab of $LiNbO_3$ having a size of 40 mm×2 mm and a thickness of 1 mm, for example. Ti is deposited to a thickness of about 100 nm on the waveguide substrate 14 by vacuum evaporation, and then etched to leave portions corresponding to waveguides by an ordinary photoetching process. Then, the assembly is heated at about 1050° C. for 10 hours to thermally diffuse Ti into $LiNbO_3$, thereby forming the Y-branch optical waveguides 4 and 8 and the optical waveguides 10 and 12.

Then, a buffer layer of $SiO_2$ is deposited to a thickness of 500 nm, for example, by vacuum evaporation, and Au is evaporated to a thickness of 150 nm as a metal base layer on the buffer layer. Thereafter, the metal base layer, except for electrode-forming regions, is removed by a photoetching process.

A resist is spin-coated to a thickness which is the same as electrodes to be formed on the waveguide substrate 14 thus processed, and then processed into a resist pattern in a region other than the electrode-forming regions according to an ordinary photolithographic process. The portion of the metal base layer which is free of the resist pattern is then plated with an Au film having such a thickness which provides a surface lying flush with the resist pattern, for example, forming the signal electrodes 161 and 162 and the ground electrodes 184 through 187.

Figure 5:
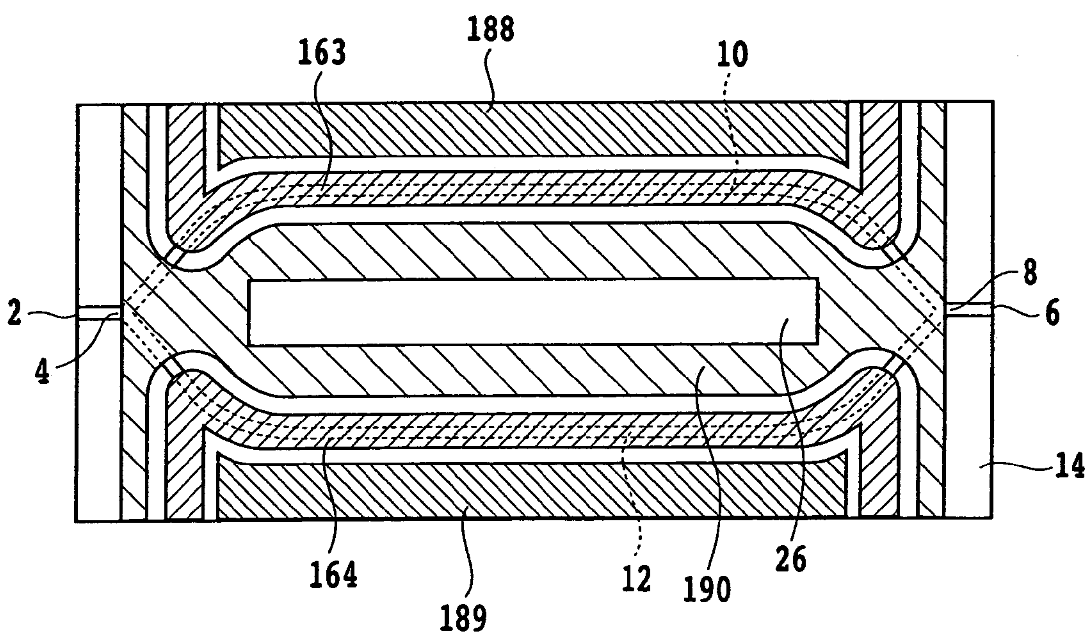
FIG. 5 is a plan view of an optical modulator according to a second embodiment of the present invention.

FIG. 5 is a plan view of an optical modulator according to a second embodiment of the present invention. In the second embodiment, the interval between the optical waveguides 10 and 12 is relatively large, so that the optical waveguides 10 and 12 have portions parallel to each other and curved portions connecting the parallel portions to the Y-branch optical waveguides 4 and 6.

Signal electrodes 163 and 164 disposed respectively on the optical waveguides 10 and 12 are formed on not only the parallel portions, but also the curved portions, of the optical waveguides 10 and 12, thereby shortening the length of the waveguide substrate 14.

Ground electrodes 188 and 189 are disposed on both sides of the signal electrodes 163 and 164, and a central ground electrode 190 is disposed between the signal electrodes 163 and 164. The central ground electrode 190 has an opening 26 which provides a feature of the present invention.

According to the present embodiment, the characteristics of the waveguide substrate 14 which also operates as a microwave resonance chamber are different from those of the conventional optical modulator shown in FIG. 3, and a dip in the frequency vs. response characteristics is effectively suppressed.

Figure 6:
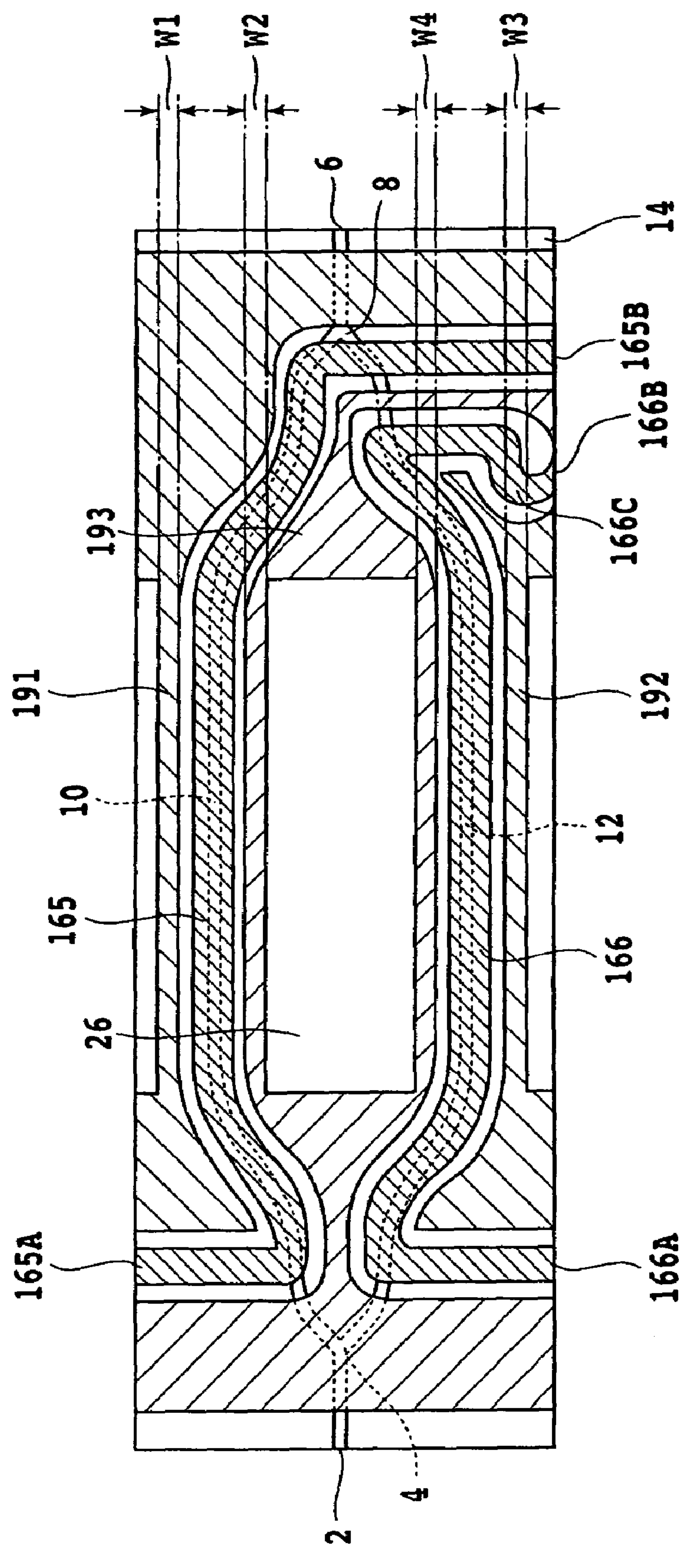
FIG. 6 is a plan view of an optical modulator according to a third embodiment of the present invention.

FIG. 6 is a plan view of an optical modulator according to a third embodiment of the present invention. Y-branch optical waveguides 4 and 8 and optical waveguides 10 and 12 are disposed on a waveguide substrate 14, and signal electrodes 165 and 166 and ground electrodes 191 and 192 and a central ground electrode 193 for applying an electric field to the waveguides are disposed. The central ground electrode 193 has an opening 26 defined therein.

According to the present embodiment, in order to facilitate electric wiring of a microwave circuit related to the signal electrodes 165 and 166, the signal electrode 165 has opposite ends 165A and 165B are exposed respectively on both sides of the waveguide substrate 14, and the signal electrode 166 has opposite ends 166A and 166B are exposed on the side of the waveguide substrate 14 where the end 165B of the signal electrode 165 is exposed. Since the signal electrodes 165 and 166 are of an asymmetric shape, they would tend to delay microwaves. In order to avoid this shortcoming, according to the present embodiment, the signal electrode 166 has a delay section 166C near the end 166B thereof. A modulating microwave signal is supplied to the signal electrodes 165 and 166 disposed as progressive-wave electrodes from the ends 165B and 166B, respectively.

The ground electrodes 191 through 193 include first and second portions W1 and W2 disposed in sandwiching relation to the optical waveguide 10, and third and fourth portions W3 and W4 disposed in sandwiching relation to the optical waveguide 12. These portions have respective widths substantially equal to each other for stabilizing the mode of microwaves propagated through the signal electrodes 165 and 166 to effectively suppress a dip in the frequency vs. response characteristics.

For reducing the present invention to practice, as with the first and second embodiments, the first and second signal electrodes and the ground electrodes may be disposed substantially symmetrically with respect to the central line of the waveguide substrate along the light propagating direction for further effectively suppressing a dip in the frequency vs. response characteristics.

Furthermore, the electrode-free portion in the cross section that is transverse to the opening in the ground electrode may be ⅓ or more of the width of the waveguide substrate for further effectively suppressing a dip in the frequency vs. response characteristics.

Figure 2:
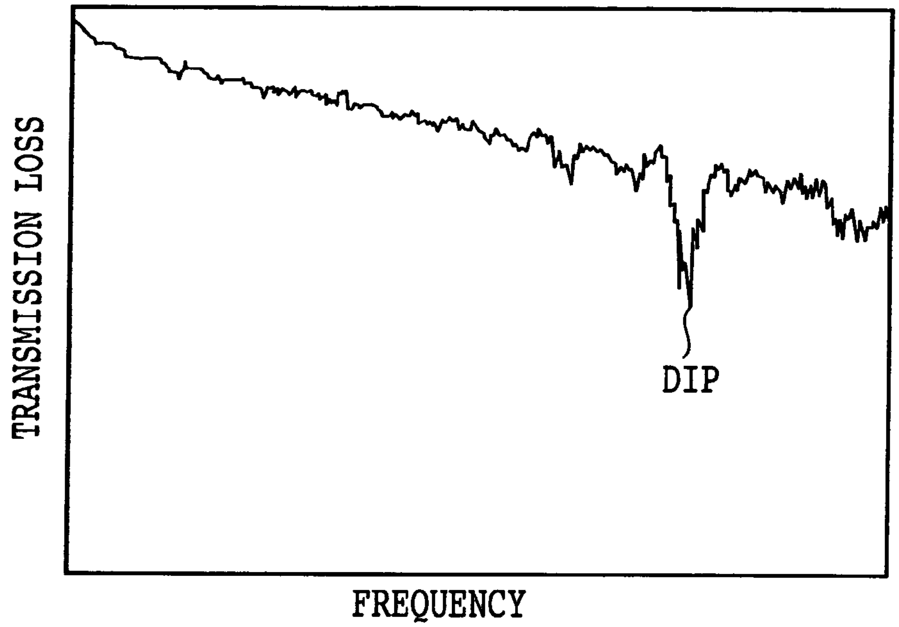
FIG. 2 is a graph showing the relationship between transmission losses and frequencies of the optical modulator shown in FIGS. 1A and 1B.
Figure 7:
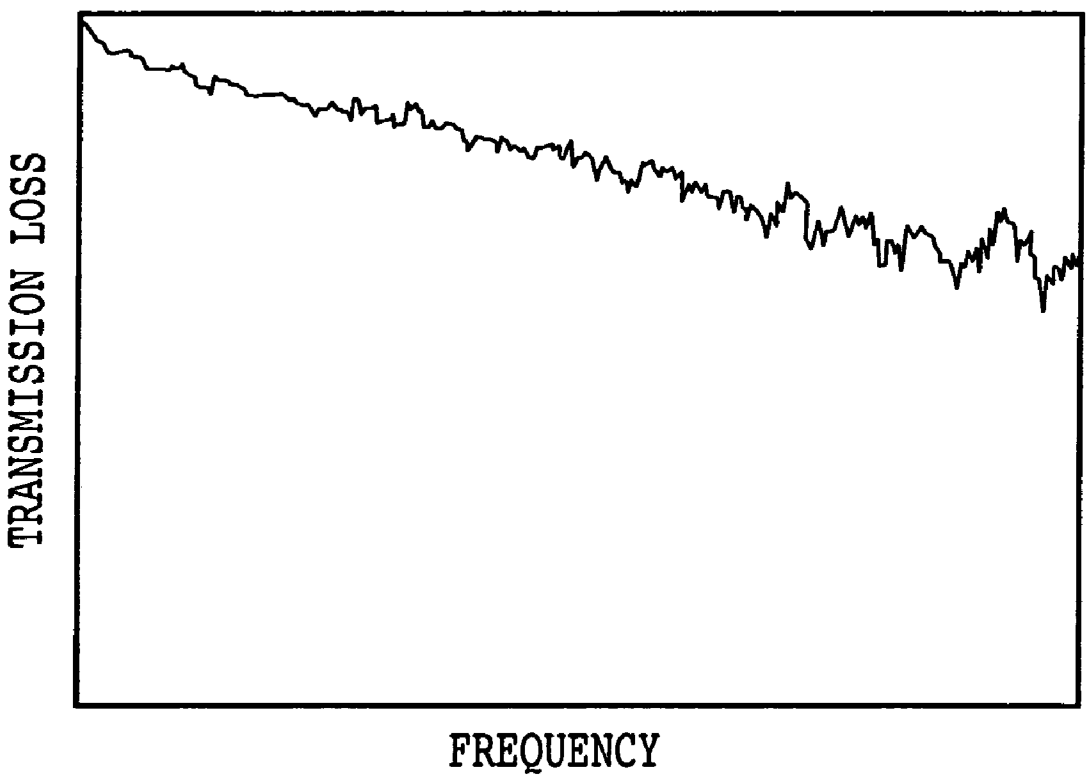
FIG. 7 is a graph showing the relationship between transmission losses and frequencies of the optical modulators according to the embodiments of the present invention.

FIG. 7 is a graph showing the relationship between transmission losses and frequencies of the optical modulators according to the embodiments of the present invention. It is apparent from a comparison with the characteristics shown in FIG. 2 that the optical modulators according to the embodiments of the present invention have a dip effectively suppressed in the frequency vs. response characteristics.

According to the present invention, as described above, there is provided a dual-drive waveguide optical modulator which is capable of effectively suppressing a dip in the frequency vs. response characteristics.

What is claimed is:

1. A waveguide optical modulator comprising:

a first Y-branch optical waveguide providing an input port;

a second Y-branch optical waveguide providing an output port;

first and second optical waveguides interconnecting the first and second Y-branch optical waveguides;

first and second signal electrodes disposed respectively on the first and second optical waveguides; and a ground electrode having a potential difference with the first and second signal electrodes and operable in coaction with the first and second signal electrodes for applying an electric field to the first and second optical waveguides;

said ground electrode including a central ground electrode disposed between the first and second optical waveguides, said central ground electrode having an opening defined therein.

2. The waveguide optical modulator according to claim 1, wherein said first and second Y-branch optical waveguides and said first and second optical waveguides are disposed on or near a surface of a waveguide substrate.

3. The waveguide optical modulator according to claim 2, wherein said first and second signal electrodes and said ground electrode are disposed substantially symmetrically with respect to a central line of said waveguide substrate along a light propagating direction.

4. The waveguide optical modulator according to claim 2, wherein an electrode-free portion in a cross section that is transverse to the opening in said ground electrode is ⅓ or more of the width of said waveguide substrate.

5. The waveguide optical modulator according to claim 2, wherein an end of said first signal electrode and a corresponding end of said second signal electrode are exposed respectively on both sides of said waveguide substrate, and another end of said first signal electrode and another corresponding end of said second signal electrode are exposed on one of the sides of said waveguide substrate.

6. The waveguide optical modulator according to claim 5, wherein one of said first and second signal electrodes includes a delay section for compensating for a delay in microwaves traveling through said first and second signal electrodes.

7. The waveguide optical modulator according to claim 1, wherein said ground electrode includes first and second portions disposed in sandwiching relation to said first optical waveguide, and third and fourth portions disposed in sandwiching relation to said second optical waveguide, said first through fourth portions having substantially equal widths.

* * * * *